Jan. 8, 1935. F. E. KNUTH 1,987,403
CULTIVATOR SHIELD
Filed March 20, 1934 2 Sheets-Sheet 2
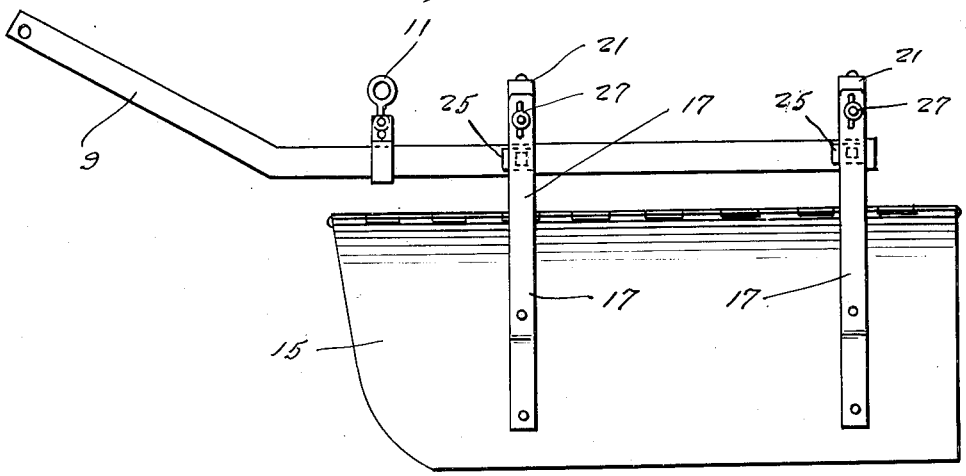
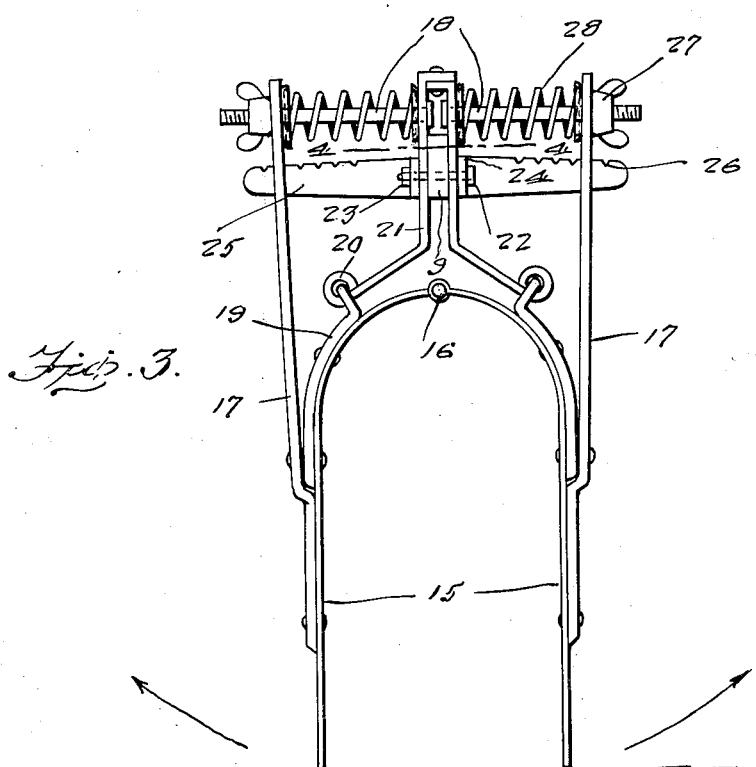
Inventor
F. E. Knuth
By Clarence A. O'Brien
Attorney Patented Jan. 8, 1935

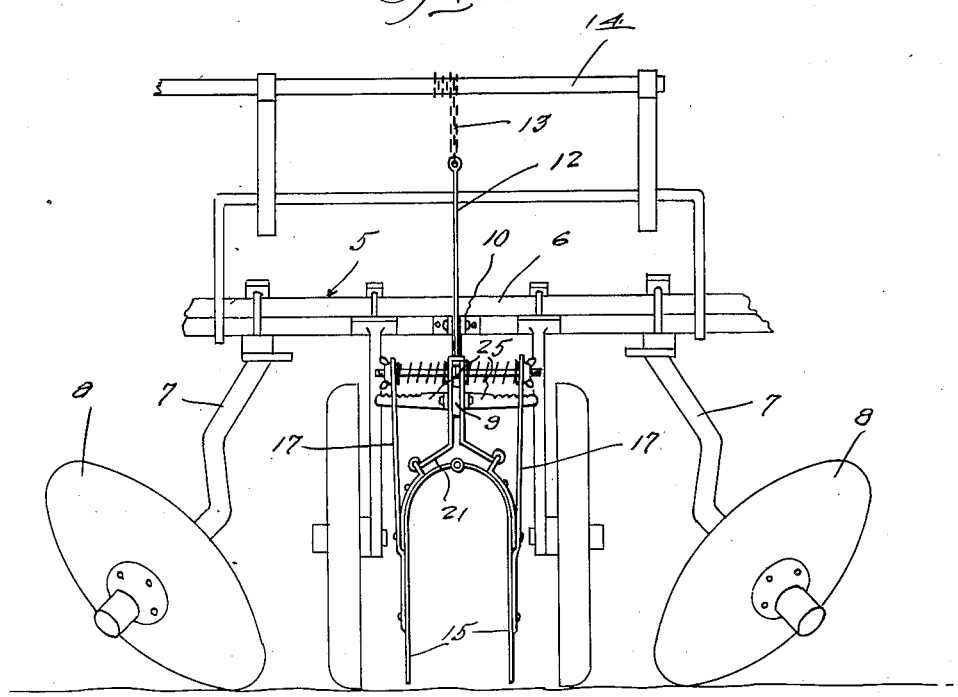
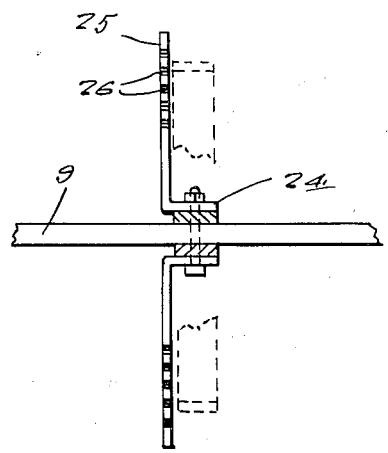
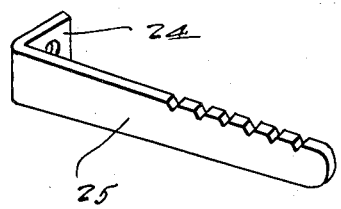

1,987,403

UNITED STATES PATENT OFFICE 1,987,403

CULTIVATOR SHIELD

Fred E. Knuth, Seward, Nebr.

Application March 20, 1934, Serial No. 716,522

2 Claims. (Cl. 97—188)

This invention appertains to new and useful improvements in shields for lister cultivators, otherwise known as go-dig machines, the principal object being to provide a shield which can be readily adjusted to meet requirements in various agricultural localities.

Another important object of the present invention is to provide a shield which is not susceptible to the development of frequent defects, and which can be easily handled to permit adjustment as well as repairs and replacement of parts.

Other objects and advantages of the invention will become apparent as the following specification proceeds.

In the drawings:—

Figure 1 represents a rear elevational view of the shield and fragmentarily showing a cultivator.

Figure 2 represents a side elevational view of the shield.

Figure 3 represents an enlarged end elevational view of the shield.

Figure 4 represents a sectional view taken substantially on line 4—4 of Figure 3.

Figure 5 represents a perspective view of one of the gauge arms.

Referring to the drawings wherein like numerals designate like parts, it can be seen in Figure 1 that numeral 5 generally refers to the cultivator machine which briefly involves the frame 6, and the shanks 7 supporting the usual lister disks 8.

Numeral 9 represents the usual rearwardly extending arm for supporting a shield to which the improved shield, shown in the accompanying drawings, is attached.

The arm 9 is pivotally mounted, as at 10, and has an eye member 11 thereon to which a rod 12 is connected, the rod in turn being connected to a chain 13 wound on the rotatable shaft 14 which is equipped with a crank or suitable means whereby the chain can be wound thereon to permit elevation of the shield.

The shield consists of a pair of side members 15—15 curved toward each other at their upper ends and hingedly connected together at their upper ends, as at 16. A pair of bars 17—17 is secured at their lower end portions to the outside of each of the side members 15, the upper ends of these bars being provided with openings for receiving the threaded end portions of the bolts 18. Adjacent each of the bars 17 on each of the side members 15 is a lug 19 apertured to receive the looped end 20 at the corresponding lower end of the adjacent U-shaped frame member 21. The arm 9 extends through these frame members 21 and bolts 22 extend through these frame members to secure the frames to the arm 9, these bolts 22 being equipped with nuts 23 and also extending through the foot portions 24 of a pair of gauge arms 25—25 for each of the frames 21.

These arms 25 project outwardly from the frames 21 in opposite directions with respect to the corresponding frames and each is provided at its upper edge with notches 26 equi-distantly apart (for instance, an inch or half an inch apart). As will be observed in Figure 3, the aforementioned bolts 18 extend through openings in the leg members of the frames 21 and outwardly so that their threaded end portions project through corresponding bars 17. Wing nuts 27 are provided on the threaded ends of the bolts 18 and can be fed inwardly to adjust the tension of the springs 28 which are interposed between the upper ends of the bars 17 and the leg portions of the frames 21.

By regulating the tension of these springs 28 and determining the tension of the springs and consequently the tensional resistance of the side members 15—15, the bars 17 can be engaged with the notches 26 in the gauge arms 25. This yielding ability of the side members 15—15 afforded by the springs 18 will permit the side sections to yield when they strike obstacles of hard substance as they pass over corn and through the ground ridges.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. In combination with the shield supporting arm of a cultivator, a frame member of U-shape between which the arm extends and is secured, the lower free ends of the frame member being diverged, a shield assembly consisting of a pair of hingedly connected sections, a loose connection between each of the sections and a corresponding lower end of the frame member, each of the said shield sections being provided with an upstanding bar, and tensioning means between the upper ends of the bars and the said frame member.

2. In combination with the shield supporting arm of a cultivator, a frame member of U-shape between which the arm extends and is secured, the lower free ends of the frame member being diverged, a shield assembly consisting of a pair of hingedly connected sections, a loose connection between each of the sections and a corresponding lower end of the frame member, each of the said shield sections being provided with an upstanding bar, tensioning means between the upper ends of the bars and the said frame member, and gauge members extending outwardly from the frame member and beyond the said bars whereby uniform tensioning of the sections can be gauged.

FRED E. KNUTH.